(12) United States Patent
Yin et al.

(10) Patent No.: US 11,067,840 B2
(45) Date of Patent: Jul. 20, 2021

(54) DISPLAY PANEL AND DISPLAY APPARATUS

(71) Applicants: Beijing BOE Optoelectronics Technology Co., Ltd., Beijing (CN); BOE Technology Group Co., Ltd., Beijing (CN)

(72) Inventors: Yanyan Yin, Beijing (CN); Zhiyong Wang, Beijing (CN); Hongyan Xing, Beijing (CN); Zhiqiang Long, Beijing (CN); Yinlin Gu, Beijing (CN); Mingjing Wang, Beijing (CN); Qi Sun, Beijing (CN); Weipeng Fu, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/887,016

(22) Filed: May 29, 2020

(65) Prior Publication Data

US 2021/0165257 A1     Jun. 3, 2021

(30) Foreign Application Priority Data

Nov. 29, 2019   (CN) ......................... 201922108891.3

(51) Int. Cl.
*G02F 1/1333* (2006.01)
*G02F 1/1368* (2006.01)
(Continued)

(52) U.S. Cl.
CPC ...... *G02F 1/133345* (2013.01); *G02F 1/1343* (2013.01); *G02F 1/1368* (2013.01);
(Continued)

(58) Field of Classification Search
CPC ........... G02F 1/133553; G02F 2203/02; G02F 2203/09; G02F 1/133504; G02F 1/133345;
(Continued)

(56) References Cited

U.S. PATENT DOCUMENTS 5,408,345 A * 4/1995 Mitsui ............... G02F 1/133553
349/42
2002/0118324 A1* 8/2002 Tsuyuki ............ G02F 1/133553
349/113

(Continued)

*Primary Examiner* — Jia X Pan
(74) *Attorney, Agent, or Firm* — Fay Sharpe LLP

(57) ABSTRACT

Disclosed are a display panel and a display apparatus. The display panel includes an array substrate and a color film substrate that are opposite to each other, a liquid crystal layer filled between the array substrate and the color film substrate, and a polarizer covering a side of the color film substrate distal from the liquid crystal layer. A protrusive structure and a reflective layer disposed between the protrusive structure and the liquid crystal layer are arranged on the array substrate. The array substrate includes a plurality of pixel units arranged on a substrate. Each pixel unit is provided with a first region and a second region that are adjacent to each other. A thickness of the pixel unit disposed in the first region is greater than that of the pixel unit disposed in the second region.

17 Claims, 6 Drawing Sheets

(51) Int. Cl.
  *G02F 1/1362* (2006.01)
  *G02F 1/1335* (2006.01)
  *G02F 1/1343* (2006.01)
(52) U.S. Cl.
  CPC .. *G02F 1/133528* (2013.01); *G02F 1/133553* (2013.01); *G02F 1/136286* (2013.01); G02F 2201/123 (2013.01)
(58) Field of Classification Search
  CPC .......... G02F 1/13439; G02F 1/136286; G02F 2001/136236; G02F 2001/136295; H01L 51/5271
  See application file for complete search history.

(56) References Cited

U.S. PATENT DOCUMENTS

| | | | | |
|---|---|---|---|---|
| 2004/0141113 | A1* | 7/2004 | Yun | G02F 1/133553 349/113 |
| 2007/0099318 | A1* | 5/2007 | Chang | G02F 1/133553 438/22 |
| 2010/0118238 | A1* | 5/2010 | Shimada | G02F 1/133555 349/113 |
| 2011/0157253 | A1* | 6/2011 | Yamazaki | G02F 1/133555 345/690 |

* cited by examiner

DISPLAY PANEL AND DISPLAY APPARATUS

This application claims priority to Chinese Patent Application No. 201922108891.3, filed Nov. 29, 2019, and entitled "DISPLAY PANEL AND DISPLAY APPARATUS", the contents of which are incorporated in their entirety herein.

TECHNICAL FIELD

The present disclosure relates to a display panel and a display apparatus.

BACKGROUND

Reflective display technologies, such as a liquid crystal display electronic shelf label (LCD ESL) capable of displaying multiple colors of pictures, are getting more and more attentions.

In a reflective display apparatus, in order to utilize external light for display, it is necessary to provide a scattering film layer having a scattering function in the display apparatus. For reduction of the cost in the related art, the traditional scattering film is replaced by additionally providing a protrusive structure on an array substrate via a bump process and combining with a reflective layer.

SUMMARY

Embodiments of the present disclosure provide a display panel and a display apparatus.

In a first aspect, the present disclosure provides a display panel. The display panel includes an array substrate and a color film substrate that are oppositely arranged, a liquid crystal layer filled between the array substrate and the color film substrate, and a polarizer covering a side of the color film substrate distal from the liquid crystal layer, wherein a protrusive structure and a reflective layer disposed between the protrusive structure and the liquid crystal layer are formed on the array substrate; wherein the array substrate includes a plurality of pixel units arranged on a substrate, wherein each pixel unit is provided with a first region and a second region that are adjacent to each other, and a thickness of a pixel unit disposed in the first region is greater than that of a pixel unit disposed in the second region; and the protrusive structure includes a first protrusion disposed in the first region and a second protrusion disposed in the second region, a first included angle $\theta_1$ is formed between a sidewall of the first protrusion and a bearing surface of the substrate, a second included angle $\theta_2$ is formed between a sidewall of the second protrusion and the bearing surface of the substrate, wherein the second included angle $\theta_2$ is substantially equal to the first included angle $\theta_1$.

Optionally, each of the first protrusion and the second protrusion is a centrosymmetric structure, an orthographic projection of the first protrusion on the substrate is a first pattern, and an orthographic projection of the second protrusion on the substrate is a second pattern, wherein the second pattern is similar to the first pattern;

the first pattern has a predetermined width $L_1$, and the first protrusion has a height $H_1=(L_1/2)*\tan\theta_1$; and the second protrusion has a predetermined height $H_2$, and the second pattern has a maximum width $L_2=L_1*(H_2/H_1)$.

Optionally, the first included angle $\theta_1$ is determined by the following equations:

$\theta_1 = \theta_{2nd\ incidence} = \theta_{refraction}/2$; and $\theta_{refraction} = \arcsin(\sin\theta_{1st\ incidence} * n_{air}/n_{cell})$, wherein $\theta_{1st}$ incidence denotes an angle of incidence of a light ray on a surface of the polarizer, $\theta_{2nd}$ incidence denotes an angle of incidence of a light ray on a surface of the reflective layer, $n_{air}$ denotes a refractive index of air, and $n_{cell}$ denotes a refractive index of a liquid crystal/color film.

Optionally, the maximum width of the second pattern is greater than that of the first pattern, and the height of the second protrusion is greater than that of the first protrusion.

Optionally, a first pattern is of either a polygonal shape or a circular shape; and if the first pattern is of the polygonal shape, the number of edges of the first pattern is identical to the number of edges of a second pattern and is not smaller than 4.

Optionally, the first pattern is of a hexagonal shape.

Optionally, the protrusive structure is a wavy protrusive structure.

Optionally, the pixel unit includes a thin film transistor (TFT), a pixel electrode disposed in the first region, a passivation layer covering the TFT and the pixel electrode, a protrusive structure disposed on a side of the passivation layer distal from the substrate, and the reflective layer, the TFT includes a gate, an active layer, a drain, a source, and a gate insulating layer that insulates and separates the gate from the active layer, the drain and the source, wherein the gate insulating layer covers the second region.

Optionally, the array substrate further includes a plurality of gate lines and a plurality of data lines that are all arranged on a side of the substrate, wherein the gate lines and the data line are intersected;

wherein the TFT is either a top-gate TFT or a bottom-gate TFT, one of the gate lines is disposed between each two adjacent rows of pixel units, and one of the data lines is disposed between each two adjacent columns of pixel units.

Optionally, the array substrate further includes a plurality of gate lines and a plurality of data lines that are all arranged on a side of the substrate, wherein the gate lines and the data lines are intersected;

wherein the TFT is a double-gate TFT, two of the gate lines are disposed between each two adjacent rows of pixel units, and one of the data lines is disposed between each two adjacent columns of pixel units.

Optionally, an orthographic projection of the protrusive structure on the substrate is staggered with orthographic projections of the data line and the TFT on the substrate.

In a second aspect, the present disclosure provides a display apparatus. The display apparatus includes the above-mentioned display panel.

DETAILED DESCRIPTION

The present disclosure will be further described below in detail in combination with the accompanying drawings and the embodiments. It should be appreciated that the specific embodiments described herein are merely used for explaining the related disclosure, rather than limiting the disclosure. In addition, it is further to be noted that, for the ease of description, only the parts related to the related disclosure are shown in the accompanying drawings.

It is to be noted that the embodiments in the present disclosure and the features in the embodiments may be combined with each other on a non-conflict basis. The present disclosure will be described below in detail with reference to the accompanying drawings and in combination with the embodiments.

Figure 1:
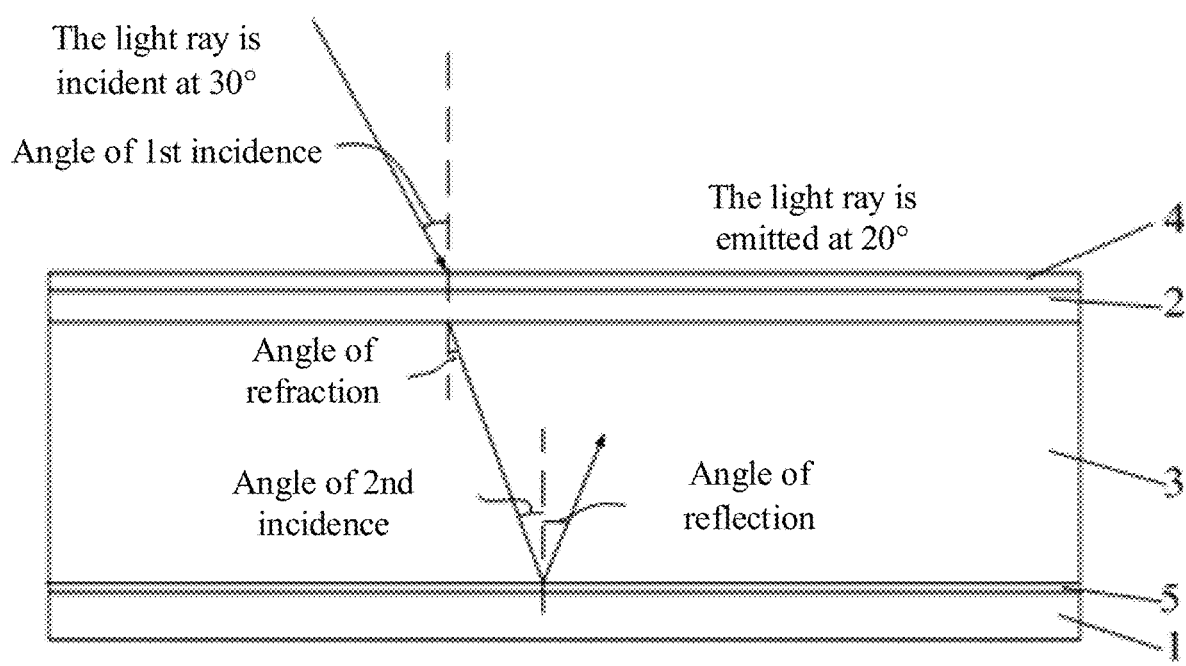
FIG. 1 is a schematic diagram of a light path in a display panel of a reflective display apparatus without a bump pattern in the related art.

FIG. 1 is a schematic diagram of a light path in a display panel of a reflective display apparatus without a bump pattern in the related art. As shown in FIG. 1, the display panel of the reflective display apparatus includes an array substrate 1 and a color film substrate 2 that are oppositely arranged, a liquid crystal layer 3 filled between the array substrate 1 and the color film substrate 2, and a polarizer 4 covering a side of the color film substrate 2 distal from the liquid crystal layer 3; and a reflective layer 5 covers the array substrate.

For example, the array substrate is not provided with the bump pattern. When being incident at 30°, an external light ray reaches a surface of the polarizer 4 first (called 1st incidence) and is refracted once upon the arrival at the polarizer 4; and the light ray is incident to an uppermost reflective layer of the array substrate. In case of no bump pattern, the light ray incident to the surface of the reflective layer (2nd incidence) is emitted in the light path in FIG. 1 according to a law of reflection.

Figure 2:
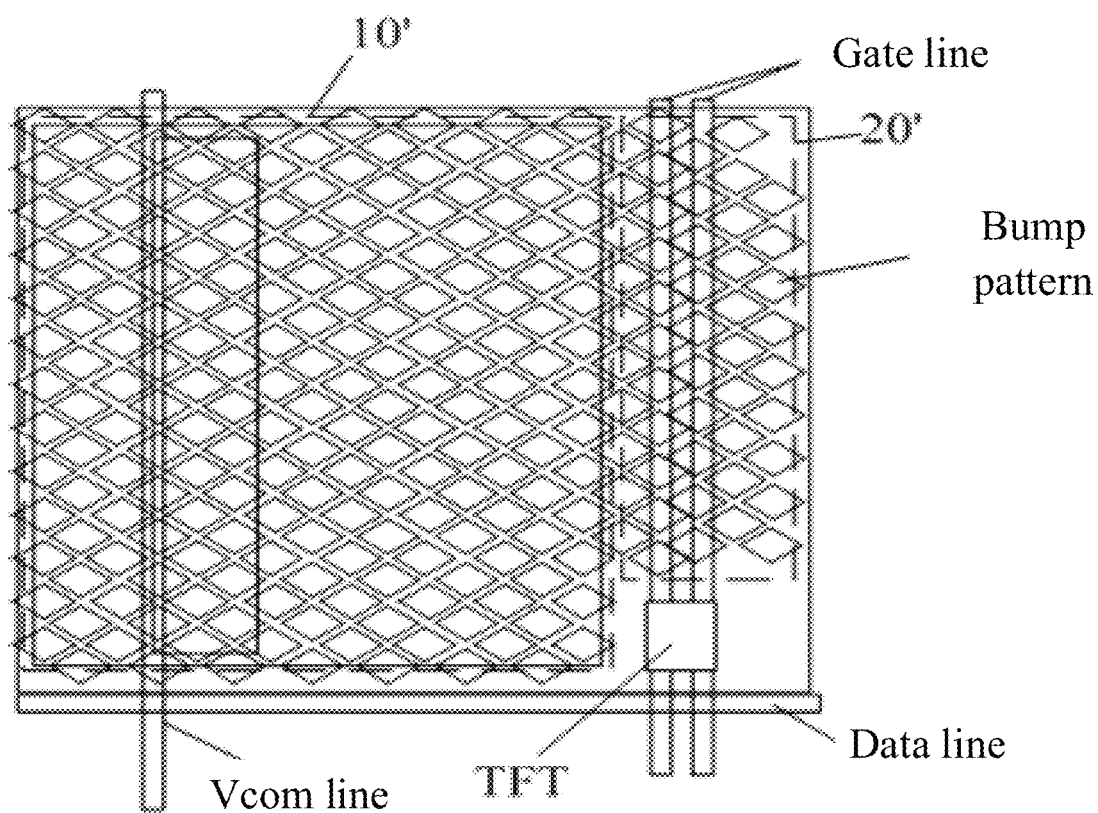
FIG. 2 is a schematic diagram of a bump pattern on an array substrate of a reflective display apparatus in the related art.
Figure 3:
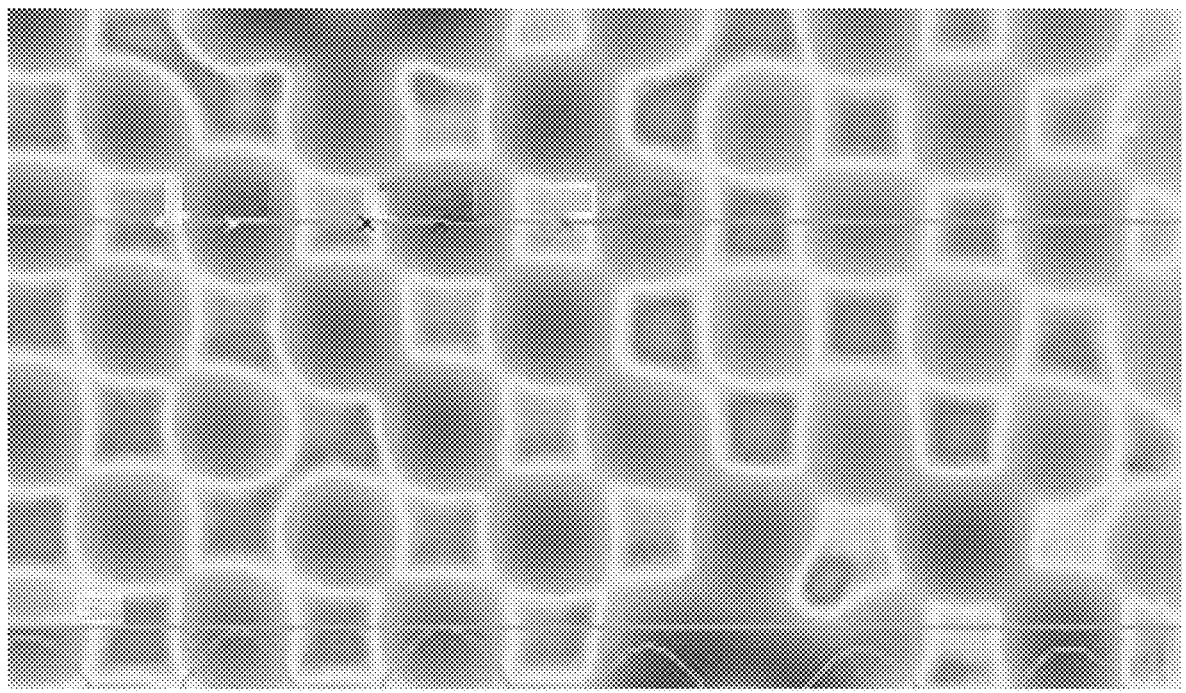
FIG. 3 is a photograph of a bump pattern of a first region in the related art under a microscope.
Figure 4:
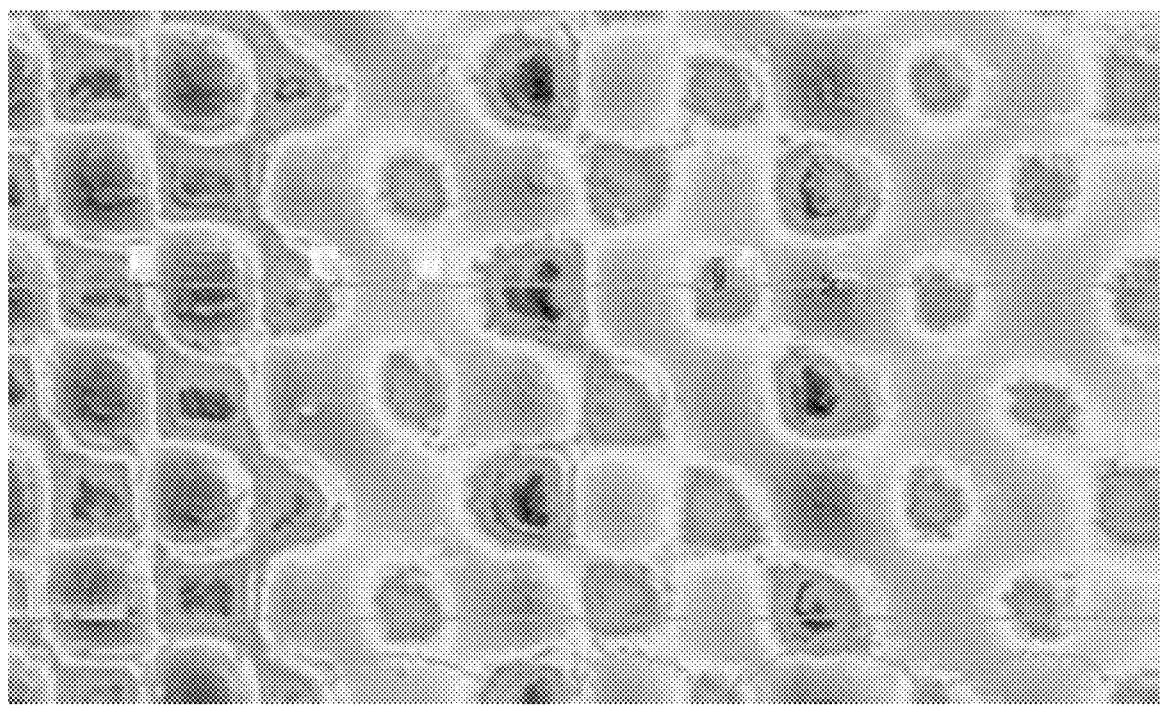
FIG. 4 is a photograph of a bump pattern of a second region in the related art under a microscope.
Figure 5:
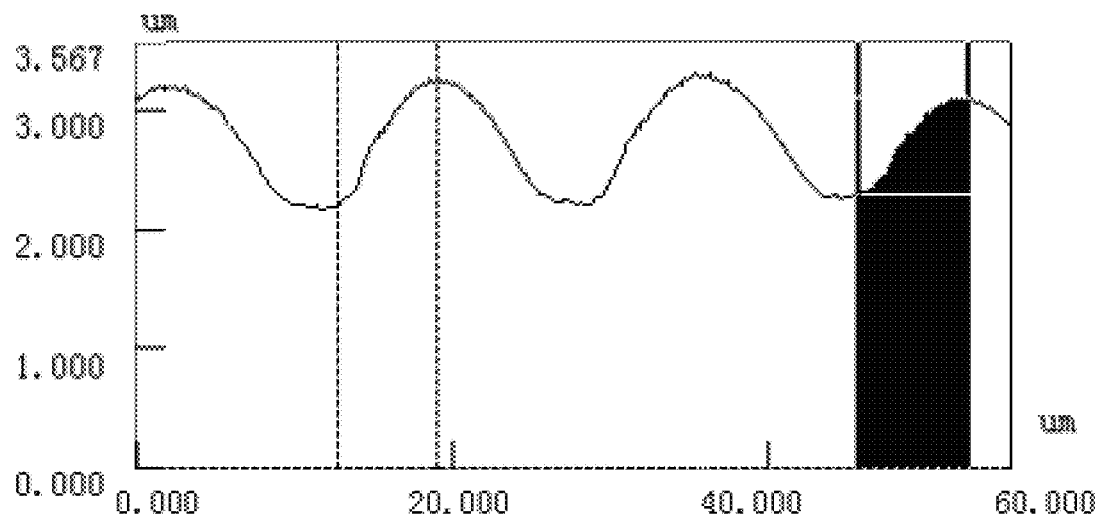
FIG. 5 is a height change chart of a bump pattern of a first region in the related art.
Figure 6:
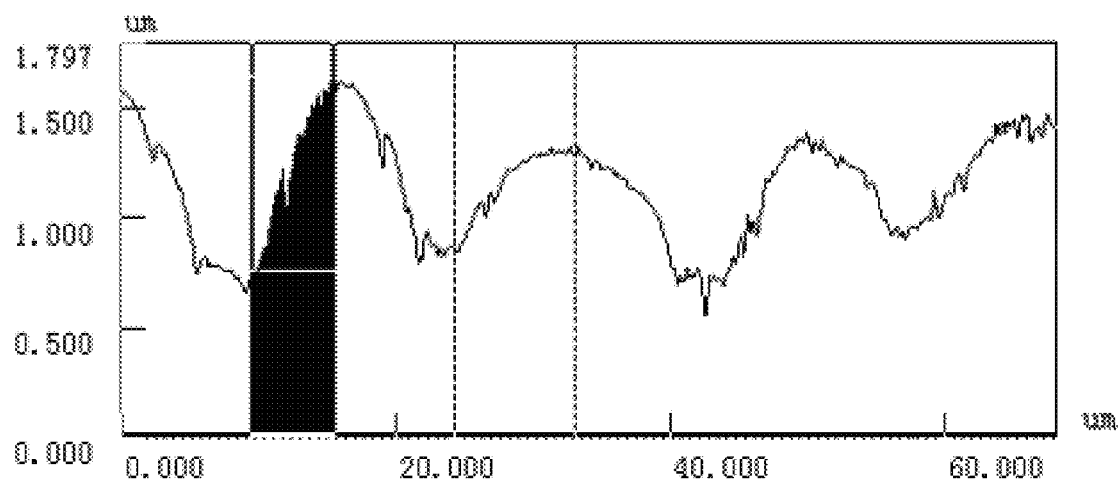
FIG. 6 is a height change chart of a bump pattern of a second region in the related art.

Due to no bump pattern in the array substrate, the effective reflection of the light ray cannot be ensured, and thus the display picture is affected. According to existing designs, the bump pattern is formed on a side, distal from the liquid crystal layer, of the reflective layer of the array substrate. The bump pattern refers to a plurality of protrusions formed by a resin layer via exposure and development. The bump pattern is formed by the resin layer on the array substrate. For the array substrate of the totally reflective display apparatus shown in FIG. 2, the dashed box 10' denotes the first region, and the dashed box 20' denotes the second region, and a thickness of the array substrate in the first region is greater than that in the second region. Due to the difference in film thickness of each region of the array substrate, the shapes of the protrusions in different regions vary in combination with FIG. 3 and FIG. 4. FIG. 5 is a height change chart for a part of bump patterns in the first region in the photograph shown in FIG. 3. FIG. 6 is a height change chart for a part of bump patterns in the second region in the photograph shown in FIG. 4. In FIG. 5 and FIG. 6, the horizontal coordinate is the horizontal position, the vertical coordinate is the height, and both the horizontal coordinate and the vertical coordinate take the micron as the unit. It can also be seen from FIG. 5 and FIG. 6 that the bump pattern of the first region has good uniformity, the bump pattern of the second region and the bump pattern of the first region have poor uniformity, and each bump pattern in the second region also has poor uniformity.

With two array substrates as an example, by measuring heights of the first region and the second regions of the two array substrates, the data shown in Table 1 are obtained.

TABLE 1

|  | Thickness of array substrate (Å) | Bump height of #1 array substrate (Å) | Bump height of #2 array substrate (Å) |
| --- | --- | --- | --- |
| First region | 32700 | 9250 | 8820 |
| Second region | 26500 | 4750 | 4340 |

As can be obviously seen from the above data, the first region and the second region are significantly different in height, and the bump height of the second region is about a half of the bump height of the first region. However, the bump width of the second region is basically identical to that of the first region at present, and the second region and the first region vary in bump height at a same exposure rate, which results in that the bump shape is different and the reflective index is non-uniform.

Figure 7:
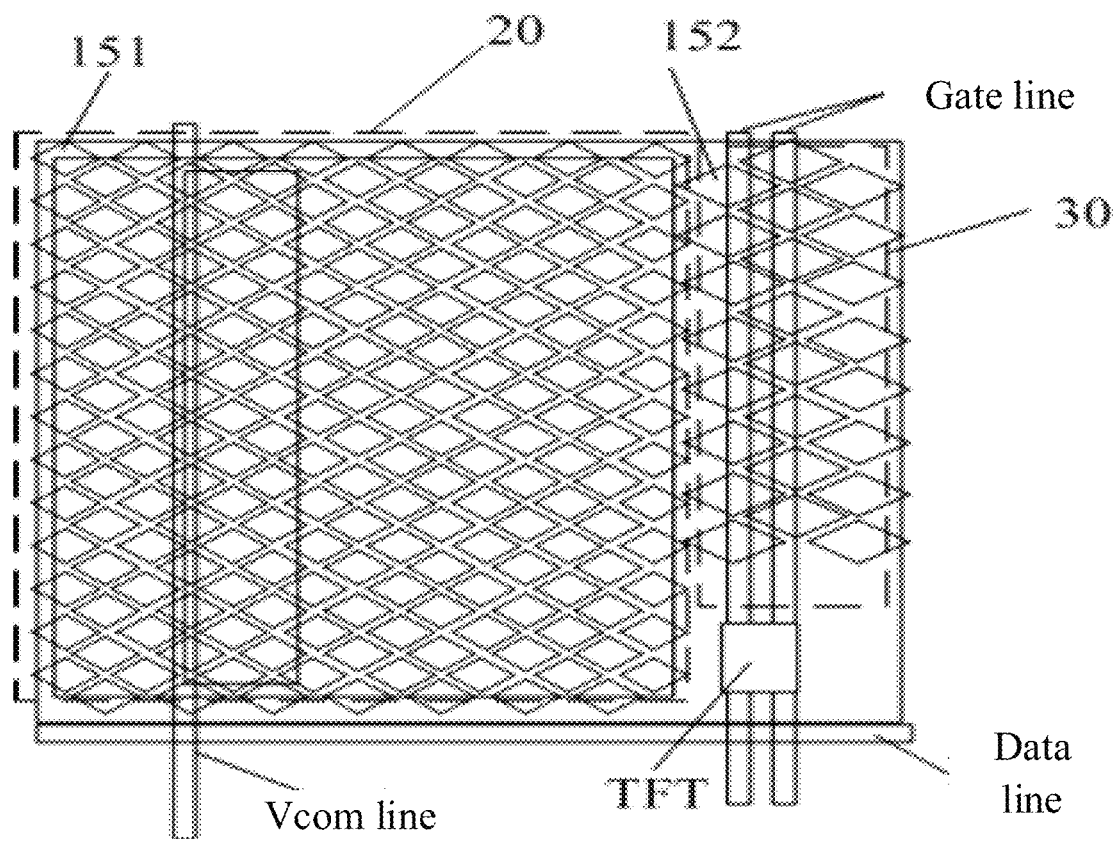
FIG. 7 is a schematic diagram of a bump pattern on an array substrate of a display panel according to an embodiment of the present disclosure.
Figure 8:
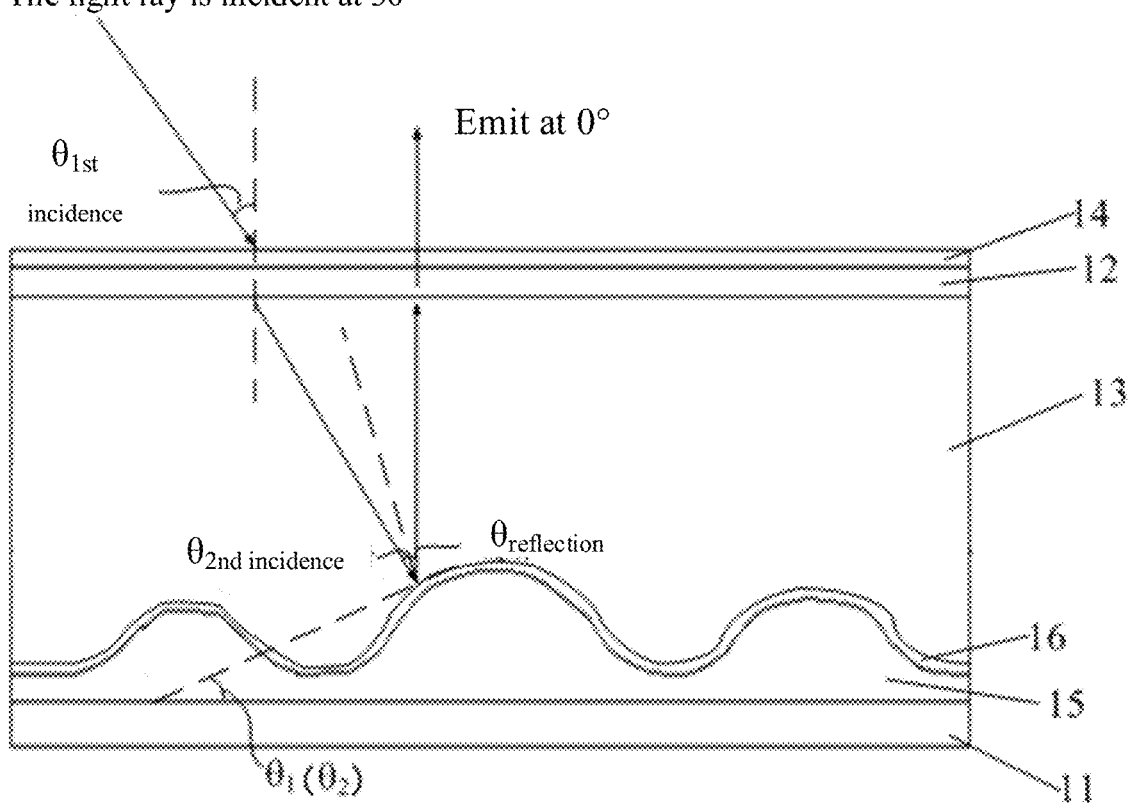
FIG. 8 is a schematic diagram of a light path of a display panel according to an embodiment of the present disclosure.

As shown in FIG. 7 and FIG. 8, an embodiment of the present disclosure provides a display panel, which includes an array substrate 11 and a color film substrate 12 that are oppositely arranged, a liquid crystal layer 13 filled between the array substrate 11 and the color film substrate 12, and a polarizer 14 covering a side of the color film substrate 12 distal from the liquid crystal layer 13; and a protrusive structure 15 and a reflective layer 16 disposed between the protrusive structure 15 and the liquid crystal layer 13 are formed on the array substrate.

The array substrate 11 includes a plurality of pixel units arranged on the substrate, each pixel unit is provided with a first region and a second region that are adjacent to each other, and a thickness of the pixel unit disposed in the first region is greater than that of the pixel unit disposed in the second region. Referring to FIG. 7, the dashed box 20 denotes the first region, and the dashed box 30 denotes the second region.

The protrusive structure 15 includes a first protrusion 151 disposed in the first region and a second protrusion 152 disposed in the second region, a first included angle $\theta_1$ is formed between a sidewall of the first protrusion and a bearing surface of a substrate, a second included angle $\theta_2$ is formed between a sidewall of the second protrusion and the bearing surface of the substrate, and the second included angle $\theta_2$ is substantially equal to the $\theta_1$. The bearing surface of the substrate is a side of the substrate facing the liquid crystal layer.

Herein, the second included angle $\theta_2$ is substantially equal to the first included angle $\theta_1$, which may refer to that a ratio of a difference between the second included angle $\theta_2$ and the first included angle $\theta_1$ to the first included angle $\theta_1$ is smaller than a threshold. The threshold may be, for example, 15%.

Exemplarily, the second included angle $\theta_2$ is equal to the first included angle $\theta_1$.

It is to be noted that FIG. 8 only illustrates the structure of either the first region or the second region. If FIG. 8 illustrates the structure of the first region, the included angle in the figure is the first included angle $\theta_1$. If FIG. 8 illustrates the structure of the second region, the included angle in the figure is the second included angle $\theta_2$.

The first protrusion and the second protrusion are of a centrosymmetric structure, i.e., each of the first protrusion and the second protrusion is the centrosymmetric structure; an orthographic projection of the first protrusion on the substrate is a first pattern; an orthographic projection of the second protrusion on the substrate is a second pattern; and the second pattern is similar to the first pattern, i.e., both the first pattern and the second pattern are similar patterns. Exemplarily, the second pattern is identical to the first pattern in structure.

the first pattern has a predetermined maximum width $L_1$, and the first protrusion has a height $H_1=(L_1/2)*\tan\theta_1$.

the second protrusion has a predetermined height $H_2$, and the second pattern has a maximum width $L_2=L_1*(H_2/H_1)$.

In the embodiment, the second included angle $\theta_2$ between the sidewall of the second protrusion and the bearing surface of the substrate is identical to the first included angle $\theta_1$ between the sidewall of the first protrusion and the bearing surface of the substrate, the light ray enters the liquid crystal layer from the surface of the polarizer, the light ray reaching to the surface of the reflective layer is reflected at an angle of $\theta_1$, and the light ray reflected by the reflective layer is perpendicular to the polarizer for emission; and therefore, the display panel has a uniform reflective index in all directions.

According to the heights of the protrusions that are obtained by exposing different regions of the resin layer under the same exposure conditions, the protrusions of the different regions are designed. Generally, it is preferable to have more protrusions. In the present disclosure, by calculating the first included angle $\theta_1$, and designing the maximum width $L_1$ of the first pattern, the height $H_1$ of the first protrusion may be determined; and according to the difference in film thickness between the first region and the second region, the height $H_2$ of the second protrusion in the second region is designed, and thus the maximum width $L_2$ of the second pattern is determined. Therefore, the protrusions having substantially identical shapes are formed in the different regions.

Further, as shown in FIG. 8, the reflective layer has an angle of reflection $\theta_{reflection}=\theta_{2nd\ incidence}$, $\theta_1=\theta_{reflection}=\theta_{2nd\ incidence}$, and therefore, the first included angle $\theta_1$ is determined by the following equations:

$$\theta_1=\theta_{2nd\ incidence}=\theta_{refraction}/2.$$

$$\theta_{refraction}=\arcsin(\sin_{\theta_{1st\ incidence}}*n_{air}/n_{cell}).$$

In the equations, $\theta_{1st\ incidence}$ denotes an angle of incidence of a light ray on a surface of the polarizer; $\theta_{2nd\ incidence}$ denotes an angle of incidence of a light ray on a surface of the reflective layer; $n_{air}$ denotes a refractive index of air; and $n_{cell}$ denotes a refractive index of a liquid crystal/color film, i.e., the refractive index of the liquid crystal relative to the color film, which may be obtained by dividing an absolute refractive index of the color film from an absolute refractive index of the liquid crystal.

For example, the external light source is incident at 30° (the external environmental light has the incident light at various angles, and the present disclosure uses 30° as a main body to evaluate the performance of the reflective display apparatus), i.e., the $\theta_{1st\ incidence}$ is 30°, $n_{air}=1.0$ and $n_{cell}\approx 1.5$; and at this time, with calculation, $\theta_1=9.7°$.

One pixel unit is separated into a first region and a second region, the first region of the pixel unit is a region where a storage capacitor is provided and disposed, and the second region is a region where no storage capacitor, TFT and other circuit elements are provided. It can be known by calculation that the first region takes up 59.68% of the whole pixel unit, the second region takes up 21.54% of the pixel unit, and another 19% is a region without the protrusive structure (corresponding to tracking regions of the TFT, the gate line and the data line in the pixel unit). In the embodiment of the present disclosure, both the first region and the second region may be two rectangular regions that are adjacent to each other. As shown in FIG. 7, the first region 20 has a large area, is proximal to one side of the pixel unit (the left side shown in the figure), and may also be called a main body region or a central region. The second region 30 has a small area, is proximal to the other side (the right side shown in the figure) of the pixel unit, and may also called an edge region. The region (TFT) without the protrusive structure is disposed at a corner of the pixel unit (the lower right corner shown in the figure).

According to the law of reflection, it can be known that when the protrusive structure has an angle of about 9.7-10°, and the reflected light is emitted at an angle of 0°, the display of the panel is the brightest. For example, in a case where the first pattern has a maximum width of 9 μm, the first protrusion has a height of about 0.8 μm.

Exemplarily, the maximum width of the second pattern is greater than that of the first pattern, and the height of the second protrusion is greater than that of the first protrusion. For example, when the height of the first protrusion is 50% of the height of the second protrusion, the maximum width of the first pattern is also 50% of the maximum width of the second pattern.

In some examples, both the first pattern and the second pattern may be of a polygonal shape, and the number of edges of the first pattern is identical to the number of the edges of the second pattern and is not smaller than 4. For example, the first pattern may be of a hexagonal shape, such that it can be ensured that the uniformity of the reflective index in all directions of the display panel is more optimal, and the problem of non-uniformity of the reflective index is prevented.

In some examples, both the first pattern and the second pattern may be of a circular shape.

Further, the protrusive structure is a wavy protrusive structure.

For example, the angle of incidence for the light ray is 30°, the first pattern obtained by the orthographic projection of the first protrusion on the substrate has a maximum width of 9 μm and a height of 0.8 μm, and the first included angle between the sidewall of the first protrusion and the bearing surface of the substrate is 9.7 degrees; and the second pattern obtained by the orthographic projection of the second protrusion on the substrate has the maximum width of 4 μm and the height of 0.34 μm, and the second included angle between the sidewall of the second protrusion and the bearing surface of the substrate is also 9.7 degrees. In order to maximize the number of protrusions at each pixel position corresponding to the array substrate, the reflective index is increased. With the first protrusion and the second protrusion as the protrusions having a standard size in the corresponding region, the protrusion having a small size may be filled between the protrusions having the standard size, thus increasing the reflective index, and making the protrusive structure in the pixel region wavy.

In some examples, the pixel unit includes a TFT, a pixel electrode layer disposed in the first region, a passivation layer covering the TFT and the pixel electrode layer, a protrusive structure disposed on a side of the passivation layer distal from the substrate, and the reflective layer, the TFT includes a gate, an active layer, a drain, a source, and a gate insulating layer that insulates and separates the gate from the active layer, the drain and the source, wherein the gate insulating layer covers the second region.

The first region of the pixel unit may include: the gate, the gate insulating layer, the drain, the source, the passivation layer, the pixel electrode layer, the protrusive structure and the reflective layer. The thickness of the pixel unit in the first region is a sum of the thicknesses of the above film layers. The second region of the pixel unit includes the gate insulating layer, the passivation layer, the protrusive structure and the reflective layer. The thickness of the pixel unit of the second region is also a sum of the thicknesses of the gate insulating layer, the passivation layer, the protrusive structure, and the reflective layer. It is apparent that the thickness of the pixel unit in the first region is greater than that of the pixel unit in the second region.

The pixel electrode is electrically connected to the drain through a via hole designed on the passivation layer.

In the embodiment, the substrate may be a transparent substrate, such as a plastic substrate and a glass substrate. Each of the gate insulating layer and the passivation layer may be a silicon oxide monolayer, a silicon nitride monolayer, a silicon oxynitride monolayer, or a laminated layer of at least two monolayers therein. The pixel electrode layer may be an indium tin oxide (ITO) thin film layer. Each of the gate, the drain, and the source may be a metal electrode such as an aluminum (Al) electrode, a copper (Cu) electrode, a molybdenum (Mo) electrode, a chromium (Cr) electrode, and a titanium (Ti) electrode, and may also be an alloy electrode. The active layer may be made of amorphous silicon, microcrystalline silicon, or polycrystalline silicon. For example, the active layer may include an amorphous silicon layer disposed on the gate insulating layer and an N-type doping amorphous silicon layer disposed on the amorphous silicon layer.

Optionally, a buffer layer is further disposed between the protrusive structure and the reflective layer to increase the adhesiveness between the reflective layer and the protrusion layer. The buffer layer covers the first region. Obviously, the Vcom line, the pixel electrode layer, the passivation layer, the resin layer formed into the first protrusion, the buffer layer, and the reflective layer are arranged in the first region; and the gate insulating layer, the resin layer formed into the second protrusion, and the reflective layer are arranged in the second region. It is apparent that the second region is thinner than the first region.

Further, the array substrate further includes a plurality of gate lines and a plurality of data lines that are all arranged on a side of the substrate, and the Vcom line intersecting with each data line. The gate line and the data line are also intersected, for example, the gate line and the data line are perpendicular.

The gate line and the Vcom line may be arranged on a same layer with the gate, and are made of a same material. The data line may be arranged on a same layer with the source and the drain, and is made of a same material.

Exemplarily, the TFT is either a top-gate TFT or a bottom-gate TFT, one gate line is disposed between each two adjacent rows of pixel units, and one data line is disposed between each two adjacent columns of pixel units. The film-layer sequence of the top-gate TFT is as follows from the bottom up: the active layer, the source-drain layer (the source, the drain and the data line), the gate insulating layer and the gate layer (the gate and the gate line). The film-layer sequence of the bottom-gate TFT is as follows from the bottom up: the gate layer, the gate insulating layer, the active layer and the source-drain layer.

Exemplarily, the TFT is a double-gate TFT, two gate lines are disposed between each two adjacent rows of pixel units, and one data line is disposed between each two adjacent columns of pixel units. The film-layer sequence of the double-gate TFT is as follows from the bottom up: the first gate layer, the gate insulating layer, the active layer, the source-drain layer, the interlayer insulating layer and the second gate layer. The interlayer insulating layer may be the silicon oxide monolayer, the silicon nitride monolayer, the silicon oxynitride monolayer, or the laminated layer of at least two monolayers therein. The first gate layer and the second gate layer may be made of a same metal material.

Referring to FIG. 7, the TFT in the embodiment may be the double-gate TFT, and the TFT is connected to two gate lines. The double-gate TFT can reduce the leakage current, such that the power consumption of the display panel is lower.

Further, in a direction perpendicular to the substrate, the position facing the data line and the FTF in the array substrate is not provided with the protrusive structure.

In order to reduce the influence of the epitaxial coupling capacitor on the product, and ensure the insulation and reliability at the data line and the FTF in the array substrate after power on, the etching is not performed at the data line and the TFT in the corresponding array substrate, and the protrusive structure is not provided in these regions.

In the embodiment of the present disclosure, the protrusive structure 15 may be made of resin.

In the embodiment of the present disclosure, the protrusive structure 15 may be formed by the resin layer via exposure and development. For example, upon the fabrication of the pixel electrode layer on the array substrate, a resin layer is deposited on the pixel electrode layer; then, a photoresist is coated on the resin layer; the resin layer is exposed by using a reflective protecting-scanning exposure machine; the exposed resin layer is developed, for example, a region not irradiated by light is developed via a developing solution, such that a pattern is formed on the resin layer; and at last, the photoresist is stripped to form the protrusive structure 15.

In order that the included angles between the fabricated first protrusion and second protrusion and the bearing surface of the substrate are equal, the pattern corresponding to the first protrusion is smaller than the pattern corresponding to the second protrusion on a mask in exposure. The proportional relationship of the size may be referred to the description on the proportion of the maximum widths of the first pattern and the second pattern.

For the sake of improving the smoothness of the product, an annealing process is increased after stripping. The annealing process is to extract organic impurity components in the material to make the performance of the protrusive structure 15 more stable, and to increase the smoothness of the protrusive structure 15 to make a slope position of each protrusive structure 15 smoother.

Exemplarily, the reflective layer in the embodiment of the present disclosure may be a metal reflective layer, such as an aluminum or silver reflective layer. The reflective layer may be formed on the surface of the protrusive structure via a coating process. As shown in FIG. 8, the reflective layer is a thin layer arranged on the surface of the protrusive structure 15. Due to the undulation of the protrusive structure 15, the reflective layer covering the surface of the protrusive structure 15 also tends to be undulated. Therefore, with the utilization of the angle of the protrusive structure 15, the best reflective effect is achieved and the display brightness is improved.

Exemplarily, the color film substrate generally includes a substrate substrate, and a color film layer and a black matrix formed on the substrate substrate; a photic region of the black matrix is filled by the color film layer; and light emitted by the pixel unit has a color after passing through the photic region filled by the color film layer.

An embodiment of the present disclosure further provides a display apparatus, which includes the above-mentioned display panel. The uniformity of the reflective index in all directions of the display panel is good, such that the display apparatus provided with the display panel has good display effect.

Described above are merely exemplary embodiments of the present disclosure and explanations of the utilized technical principles. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A display panel, comprising an array substrate and a color film substrate that are oppositely arranged, a liquid crystal layer filled between the array substrate and the color film substrate, and a polarizer covering a side of the color film substrate distal from the liquid crystal layer, a protrusive structure and a reflective layer disposed between the protrusive structure and the liquid crystal layer being formed on the array substrate; wherein
the array substrate comprises a plurality of pixel units arranged on a substrate, each pixel unit being provided with a first region and a second region that are adjacent to each other, and a thickness of a pixel unit disposed in the first region is greater than that of a pixel unit disposed in the second region; and
the protrusive structure comprises a first protrusion disposed in the first region and a second protrusion disposed in the second region, a first included angle $\theta_1$ being formed between a sidewall of the first protrusion (151) and a bearing surface of the substrate, a second included angle $\theta_2$ being formed between a sidewall of the second protrusion and the bearing surface of the substrate, and the second included angle $\theta_2$ being substantially equal to the first included angle $\theta_1$;
wherein each of the first protrusion and the second protrusion is a centrosymmetric structure, an orthographic projection of the first protrusion on the substrate is a first pattern, and an orthographic projection of the second protrusion on the substrate is a second pattern, the second pattern being similar to the first pattern;
the first pattern has a predetermined maximum width $L_1$, and the first protrusion has a height $H_1=(L_1/2)*\tan\theta_1$;
the second protrusion has a predetermined height $H_2$, and the second pattern has a maximum width $L_2=L_1*(H_2/H_1)$; and
the maximum width of the second pattern is greater than that of the first pattern, and the height of the second protrusion is greater than that of the first protrusion.

2. The display panel according to claim 1, wherein the first included angle $\theta_1$ is determined by the following equations:

$$\theta_1=\theta_{2nd\ incidence}=\theta_{refraction}/2;\text{ and}$$

$$\theta_{refraction}=\arcsin(\sin\theta_{1st\ incidence}*n_{air}/n_{cell}),$$

wherein $\theta_{1st\ incidence}$ denotes an angle of incidence of a light ray on a surface of the polarizer, $\theta_{2nd\ incidence}$ denotes an angle of incidence of a light ray on a surface of the reflective layer, $n_{air}$ denotes a refractive index of air, and $n_{cell}$ denotes a refractive index of a liquid crystal/color film.

3. The display panel according to claim 1, wherein the first pattern is of either a polygonal shape or a circular shape; and
if the first pattern is of the polygonal shape, the number of edges of the first pattern is identical to the number of edges of the second pattern and is not smaller than 4.

4. The display panel according to claim 3, wherein the first pattern is of a hexagonal shape.

5. The display panel according to claim 1, wherein the protrusive structure is a wavy protrusive structure.

6. The display panel according to claim 1, wherein the pixel unit comprises a thin film transistor (TFT).

7. The display panel according to claim 6, wherein the array substrate further comprises a plurality of gate lines and a plurality of data lines that are all arranged on a side of the substrate, the gate lines and the data lines being intersected;
wherein the TFT is either a top-gate TFT or a bottom-gate TFT, one of the gate lines is disposed between each two adjacent rows of pixel units, and one of the data lines is disposed between each two adjacent columns of pixel units.

8. The display panel according to claim 7, wherein an orthographic projection of the protrusive structure on the substrate is staggered with orthographic projections of the data line and the TFT on the substrate.

9. The display panel according to claim 6, wherein the array substrate further comprises a plurality of gate lines and a plurality of data lines that are all arranged on a side of the substrate, and the gate lines and the data lines being intersected;
wherein the TFT is a double-gate TFT, two of the gate lines are disposed between each two adjacent rows of pixel units, and one of the data lines is disposed between each two adjacent columns of pixel units.

10. A display apparatus, comprising a display panel; wherein
the display panel comprises an array substrate and a color film substrate that are oppositely arranged, a liquid crystal layer filled between the array substrate and the color film substrate, and a polarizer covering a side of the color film substrate distal from the liquid crystal layer, and a protrusive structure and a reflective layer disposed between the protrusive structure and the liquid crystal layer are formed on the array substrate; wherein
the array substrate comprises a plurality of pixel units arranged on the substrate, each pixel unit being provided with a first region and a second region that are adjacent to each other, and a thickness of a pixel unit disposed in the first region being greater than that of a pixel unit disposed in the second region; and
the protrusive structure comprises a first protrusion disposed in the first region and a second protrusion disposed in the second region, a first included angle $\theta_1$ being formed between a sidewall of the first protrusion and a bearing surface of the substrate, a second included angle $\theta_2$ being formed between a sidewall of the second protrusion and the bearing surface of the substrate, and the second included angle $\theta_2$ being substantially equal to the first included angle $\theta_1$;
wherein each of the first protrusion and the second protrusion is a centrosymmetric structure, an orthographic projection of the first protrusion on the substrate is a first pattern, and an orthographic projection of the second protrusion on the substrate is a second pattern, the second pattern being similar to the first pattern;

the first pattern has a predetermined maximum width $L_1$, and the first protrusion has a height $H_1=(L_1/2)*\tan\theta_1$;

the second protrusion has a predetermined height $H_2$, and the second pattern has a maximum width $L_2=L_1*(H_2/H_1)$; and the maximum width of the second pattern is greater than that of the first pattern, and the height of the second protrusion is greater than that of the first protrusion.

11. The display apparatus according to claim 10, wherein the first included angle $\theta_1$ is determined by the following equations:

$$\theta_1=\theta_{2nd\ incidence}=\theta_{refraction}/2;\ \text{and}$$

$$\theta_{refraction}=\arcsin(\sin\theta_{1st\ incidence}*n_{air}/n_{cell}),$$

wherein $\theta_{1st\ incidence}$ denotes an angle of incidence of a light ray on a surface of the polarizer, $\theta_{2nd\ incidence}$ denotes an angle of incidence of a light ray on a surface of the reflective layer, $n_{air}$ denotes a refractive index of air, and $n_{cell}$ denotes a refractive index of a liquid crystal/color film.

12. The display apparatus according to claim 10, wherein the first pattern is of either a polygonal shape or a circular shape; and if the first pattern is of the polygonal shape, the number of edges of the first pattern is identical to the number of edges of the second pattern and is not smaller than 4.

13. The display apparatus according to claim 12, wherein the first pattern is of a hexagonal shape.

14. The display apparatus according to claim 10, wherein the protrusive structure is a wavy protrusive structure.

15. The display apparatus according to claim 10, wherein the pixel unit comprises a thin film transistor (TFT).

16. The display apparatus according to claim 15, wherein the array substrate further comprises a plurality of gate lines and a plurality of data lines that are all arranged on a side of the substrate, the gate lines and the data lines being intersected;

wherein the TFT is either a top-gate TFT or a bottom-gate TFT, one of the gate lines is disposed between each two adjacent rows of pixel units, and one of the data lines is disposed between each two adjacent columns of pixel units.

17. The display apparatus according to claim 15, wherein the array substrate further comprises a plurality of gate lines and a plurality of data lines that are all arranged on a side of the substrate, the gate lines and the data lines being intersected;

wherein the TFT is a double-gate TFT, two of the gate lines are disposed between each two adjacent rows of pixel units, and one of the data lines is disposed between each two adjacent columns of pixel units.

* * * * *